(12) United States Patent
Ball et al.

(10) Patent No.: US 7,579,818 B2
(45) Date of Patent: Aug. 25, 2009

(54) CURRENT REGULATOR AND METHOD THEREFOR

(75) Inventors: Alan R. Ball, Gilbert, AZ (US); David M. Heminger, Mesa, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 393 days.

(21) Appl. No.: 11/190,226

(22) Filed: Jul. 28, 2005

(65) Prior Publication Data

US 2007/0024259 A1      Feb. 1, 2007

(51) Int. Cl.
*G05F 1/00*  (2006.01)
*G01R 29/02* (2006.01)

(52) U.S. Cl. .................. 323/284; 323/281; 323/283; 327/37

(58) Field of Classification Search ............. 323/222, 323/280, 281, 282, 284, 285, 283, 31–38, 323/172–184

See application file for complete search history.

(56) References Cited

U.S. PATENT DOCUMENTS

| | | | | |
|---|---|---|---|---|
| 4,672,303 A | | 6/1987 | Newton | |
| 5,335,162 A | * | 8/1994 | Martin-Lopez et al. | 363/97 |
| 5,359,281 A | * | 10/1994 | Barrow et al. | 323/284 |
| 5,447,522 A | * | 9/1995 | Chang et al. | 607/7 |
| 5,663,667 A | * | 9/1997 | Blum et al. | 327/134 |
| 5,814,979 A | * | 9/1998 | Grimm | 323/284 |
| 5,847,554 A | * | 12/1998 | Wilcox et al. | 323/282 |
| 5,949,226 A | * | 9/1999 | Tanaka et al. | 323/285 |
| 5,955,872 A | * | 9/1999 | Grimm | 323/283 |
| 5,959,443 A | * | 9/1999 | Littlefield | 323/287 |
| 6,307,726 B1 | * | 10/2001 | Marshall et al. | 361/93.9 |
| 6,445,530 B1 | * | 9/2002 | Baker | 360/78.04 |
| 6,469,914 B1 | * | 10/2002 | Hwang et al. | 363/21.01 |
| 6,717,787 B2 | * | 4/2004 | Barker | 361/93.7 |
| 6,756,771 B1 | * | 6/2004 | Ball et al. | 323/222 |
| 6,768,655 B1 | * | 7/2004 | Yang et al. | 363/21.01 |
| 7,102,339 B1 | * | 9/2006 | Ferguson | 323/284 |
| 7,279,869 B2 | * | 10/2007 | Tzeng et al. | 323/222 |
| 2006/0209581 A1 | * | 9/2006 | Choi et al. | 363/120 |

OTHER PUBLICATIONS

"Dynamics of Current Regulator with Hysteresis Control and Clocked Commnication in Application to Power Electronic Systems", Kolokolov et al., PhysCon 2003, St. Petersburg, Russia, Copyright 2003 IEEE, pp. 1165-1169.

* cited by examiner

*Primary Examiner*—Jessica Han
*Assistant Examiner*—Emily Pham
(74) *Attorney, Agent, or Firm*—Robert F. Hightower

(57) ABSTRACT

In one embodiment, a current regulator is configured to form a first signal representative of a current flow through a power switch and to use the first signal to determine an off-time of the power switch.

18 Claims, 4 Drawing Sheets

CURRENT REGULATOR AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to manufacture power supply controllers that regulated current for a power supply system. These were often referred to as current regulators. The current regulators generally switched a power transistor to control current flow through an inductor in order to regulate a current to a desired value. In order to measure or determine the value of the current through the inductor, the system typically utilized a device external to the current regulator such as a current sense winding of a transformer or a resistor in series with the power transistor or the inductor. The current regulator used this measured value to control the current. The elements used to sense the current, such as the current sense transformer and current sense resistor, added cost to the system. Additionally, the current sense resistor could add additional power dissipation.

Accordingly, it is desirable to have a method of determining current flow for a current regulator that uses fewer components externally to the controller and that has a lower cost.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay between the reaction that is initiated by the initial action.

DETAILED DESCRIPTION OF THE DRAWINGS

Figure 1:
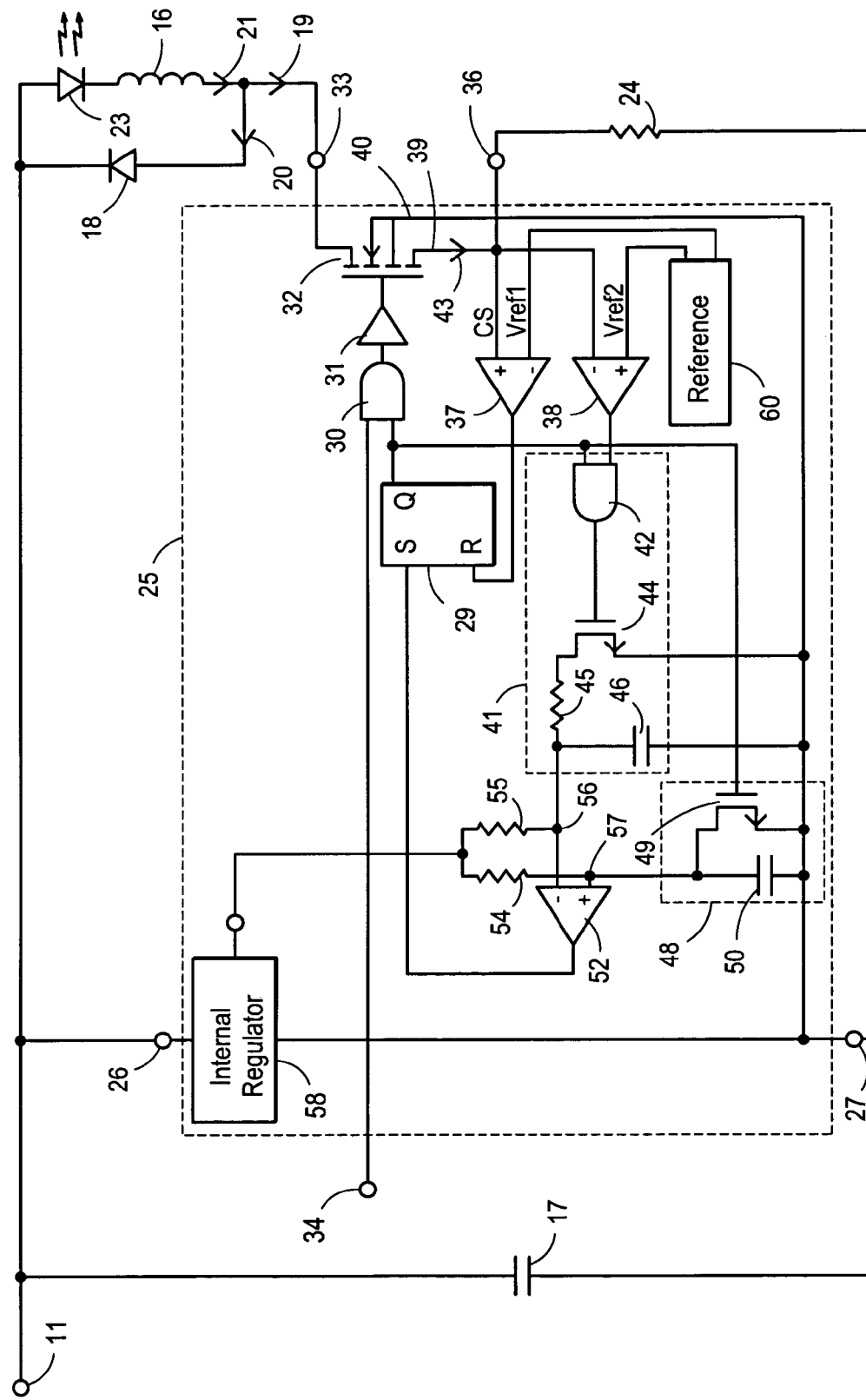
FIG. 1 schematically illustrates an embodiment of a portion of a control system that includes an embodiment of a current regulator in accordance with the present invention.

FIG. 1 schematically illustrates an exemplary embodiment of a portion of a control system 10 that includes an exemplary form of a switching current regulator 25. System 10 generally receives power from a voltage source, such as a rectified ac voltage or a dc voltage, between a power input terminal 11 and a power return terminal 12 and forms a regulated output current 21 that flows through an inductor 16. Inductor 16 facilitates forming current 21. A filter capacitor 17 may be connected between terminals 11 and 12 in order to reduce ripple on the input voltage from terminal 11 and to provide a path for the ac current that results from switching inductor 16. A catch diode 18 generally is used to assist in discharging inductor 16. A load such as a light emitting diode (LED) 23 may be connected to be powered by current 21. Although the load is illustrated as LED 23, those skilled in the art will appreciate that a plurality of LEDs may be used for the load or that other elements that require a regulated current, such as an incandescent light bulb, may form the load.

Regulator 25 is configured to control a peak value and a minimum value or valley value of current 21 to substantially constant values forming a hysteretic or ripple regulator. Maintaining substantially constant values of the peak and valley currents results in an average current with two constant values which is desirable for driving a load that has s substantially constant load current such as an LED. Regulator 25 receives power between a voltage input 26 and a voltage return 27. Input 26 typically is connected to terminal 11 and return 27 typically is connected to terminal 12. An enable signal is received on an enable input 34 and enables the operation of regulator 25. Regulator 25 typically includes a SenseFET type of power transistor 32, a PWM latch 29, PWM control logic illustrated by an AND gate 30, a driver 31, a first current comparator or peak current comparator 37, a second current comparator or valley current comparator 38, a reference voltage generator or reference 60, an off-time reference circuit 41, an off-time control circuit 48, resistors 54 and 55, and an off-time comparator 52. Regulator 25 may also include an internal regulator 58 that is used to provide an internal operating voltage for operating other elements of regulator 25 such as gate 30, driver 31, and latch 29. Regulator 25 may also include other well know functions such as a thermal shut-down circuit or an under-voltage lockout circuit that are not shown in FIG. 1. Reference 60 forms reference signals, such as a first reference signal Vref1 and a second reference signal Vref2, that are used by other portions of regulator 25. A PWM section of regulator 25 includes latch 29, gate 30, and driver 31. Driver 31 is formed to receive the output of gate 30 and provide sufficient drive to control transistor 32. Although transistor 32 is illustrated as a portion of regulator 25, in some embodiments SenseFET type of power transistor 32 may be external to regulator 25.

A SenseFET type of transistor generally is formed to include a main transistor portion and a sensing portion. The SenseFET type of transistor also generally includes a parasitic body diode that is not shown in FIG. 1. Typically, the SenseFET type of transistor is formed of many transistor cells that are interconnected to form a larger transistor that can have a large load current with a low on-resistance. A few of the cells have their sources separated from the sources of the remaining cells and are brought to a separate external terminal or sense terminal, such as a sense terminal 39 of transistor 32. The remainder of the sources is connected together to form a source, such as a source 40 of transistor 32. The drains and gates of all the cells generally are common to form the respective drain and gate. SENSEFET is a trademark of Motorola, Inc. of Schaumburg, Ill. One example of a SENSEFET type of transistor is disclosed in U.S. Pat. No. 4,553,084 issued to Robert Wrathall on Nov. 12, 1985, which is hereby incorporated herein by reference.

When a load current 19 flows through transistor 32, a first portion of current 19 flows through source 40 and induces a sense current 43 to flow through sense terminal 39. Sense current 43 is used to form a sense signal on a sense input 36 that is representative of current 19. Since transistor 32 is a SenseFET type of transistor, sense current 43 can be used to determine the value of current 19 and to determine when to disable transistor 32. However, when transistor 32 is disabled, current 43 does not flow thus transistor 32 does not provide a signal that can be used to determine when inductor 16 is discharged to a desired level or when to re-enable transistor 32. However, regulator 25 is configured to form an off-time reference signal on a node 56 and an off-time control signal on a node 57 to estimate the appropriate off-time for transistor 32. Regulator 25 uses the valley value of current 19 to assist in forming the off-time reference signal. The exemplary embodiment of off-time reference circuit 41 includes an AND gate 42, a discharge transistor 44, a discharge resistor 45, and a storage capacitor 46. The exemplary embodiment of off-time control circuit 48 includes a discharge transistor 49 and a storage capacitor 50. Resistors 54 and 55 function as current sources that are used to charge respective capacitors 50 and 46. The time constant of resistor 54 and capacitor 50 is typically chosen to be between about twenty to five hundred (20-500) times faster than the time constant of resistor 55 and capacitor 46 so that the off-time reference signal on node 56 is substantially a dc value as compared to the off-time control signal on node 57.

Figure 2:
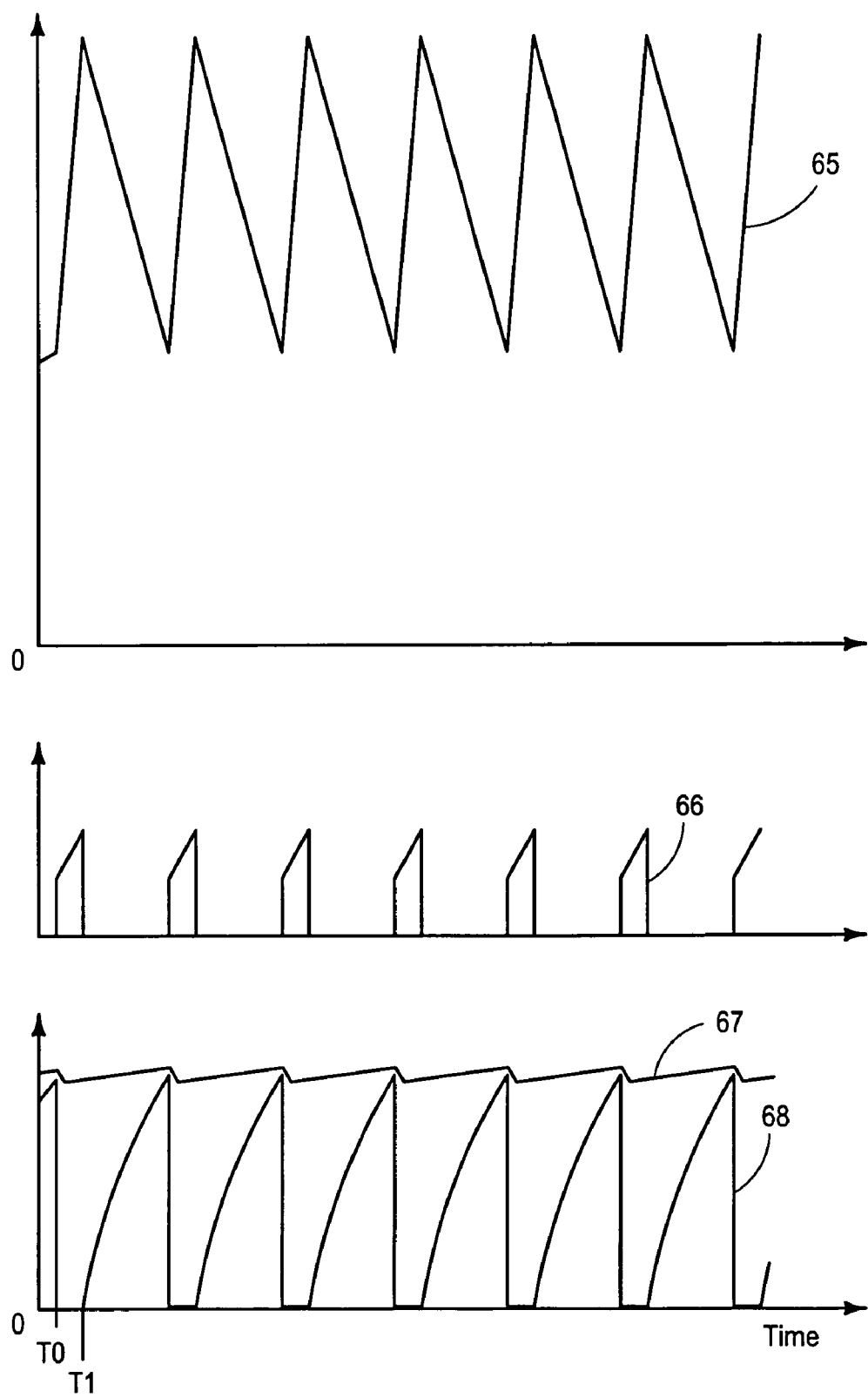
FIG. 2 is a graph having plots that illustrate some signals of the current regulator of FIG. 1 in accordance with the present invention.

FIG. 2 is a graph having plots that illustrate signals at various points within regulator 25 during the operation of regulator 25. The abscissa indicates time and the ordinate indicates the value of the signal of each plot. A plot 65 illustrates current 21 through inductor 16. A plot 66 illustrates current 19 through transistor 32. A plot 67 illustrates the voltage stored on capacitor 46, and a plot 68 indicates the voltage stored on capacitor 50. This description has references to both FIG. 1 and FIG. 2.

When the enable signal on input 34 is asserted, regulator 25 is enabled to operate and control the value of currents 19, 20, and 21, thus, the value of the output voltage. Although the enable signal is illustrated as being asserted when it is high, those skilled in the art will appreciate that controller 25 may be formed so that the enable signal is asserted when low. Setting latch 29 causes the Q output to go high which forces the output of gate 30 and driver 31 high to enable transistor 32. Those skilled in the art will appreciate that the high from the Q output may begin the process of enabling transistor 32 but that due to the capacitive loads it may take some extra time to fully enable transistor 32. Enabling transistor 32 causes current 19 to flow through inductor 16 as illustrated by plots 65 and 66 at a time T0. Current 19 also flows through an output 33 of regulator 25, and through transistor 32. A first portion of current 19 flows through source 40, and a second portion flows through sense terminal 39 as current 43, through a sense input 36 of regulator 25, and through a resistor 24 to form a current sense (CS) signal on input 36. The current sense (CS) signal is representative of the value of current 19. At the time that transistor 32 is beginning to be enabled, inductor 16 generally is not completely discharged and the value of current 19 generally does not begin at zero but starts at some value greater than zero as illustrated by a value I1 of plot 66 at time T0. This value of current 19 is referred to as the valley value or valley current and the maximum value of current 19 is referred to as the peak value or peak current. Regulator 25 controls the peak value and the valley value to form a substantially constant regulated average value of current 19. As illustrated by plot 68 at time T0, the high from latch 29 also enables transistor 49 to discharge capacitor 50 and reset off-time control circuit 48.

As will be seen further hereinafter, off-time reference circuit 41 forms the off-time reference signal on node 56 to be representative of the difference between the actual valley value of current 19 for the present cycle of regulator 25 and a desired valley value of current 19. This desired valley value of current 19 is represented by the value of the sense signal on input 36 that is approximately equal to the value of Vref2. In operation, circuit 41 slowly charges capacitor 46 through resistor 55 continuously and adjusts the value of the off-time reference signal responsively to the valley value of current 19. Each time the Q output of latch 29 goes high to start a cycle of regulator 25, the high Q output begins enabling transistor 32. The high from the Q output is also received by one input of gate 42. As explained hereinbefore, the valley value of current 19 when transistor 32 is enabled is less than the peak value but generally is not zero. If the valley value of current 19 is low enough to cause the CS signal to be less than the value of Vref2, the output of comparator 38 is high. Since the Q output of latch 29 is also high, the high from comparator 38 forces the output of gate 42 high thereby enabling transistor 44. Transistor 44 begins discharging capacitor 46 thereby adjusting the value of the voltage on capacitor 46 and reducing the value of the off-time reference signal on node 56 as illustrated by plot 67 at time T0. As the value of current 19 increases, current 43 increases causing the CS signal to also increase. Once currents 19 and 43 increase sufficiently for the CS signal to be no less than Vref2, the output of comparator 38 goes low thereby forcing the output of gate 42 low and disabling transistor 44. Thus, the off-time reference signal value has been adjusted to be representative of a difference between the actual value of the valley current and the desired value represented by the value of Vref2 and the CS signal. Disabling transistor 44 allows resistor 55 to again slowly charge capacitor 46. Resistor 45 generally is much smaller than resistor 55, thus, enabling transistor 44 quickly adjusts the value of the voltage on capacitor 46 even for small differences between the CS signal and Vref2. Resistor 45 generally is about ten to one hundred (10-100) times smaller than resistor 55 and preferably is about twenty five (25) times smaller. If the valley value of current 19 when transistor 32 is enabled is sufficiently high to cause the CS signal to be greater than the value of Vref2, the output of comparator 38 is low and circuit 41 does not enable transistor 44, thus, the value of the off-time reference signal is allowed to continue to increase thereby adjusting the value of the voltage on capacitor 46 so that controller 25 supplies more current.

As the value of current 19 continues to increase toward the peak value, comparator 37 is used to disable transistor 32 and begin the discharge portion of the cycle of regulator 25. As the value of current 19 continues to increase, the CS signal increases to a value that is no less than Vref1 which forces the output of comparator 37 high thereby resetting latch 29 and forcing the Q output low to begin disabling transistor 32. Thus, the value of Vref1 controls the peak value of current 19. The low from latch 29 also disables transistor 49 thereby allowing capacitor 50 to begin charging through resistor 54 as illustrated by plot 68 at a time T1. When capacitor 50 charges to a value that is approximately no less than the value stored on capacitor 46, the output of comparator 52 is forced low thereby setting latch 29 to again begin enabling transistor 32 and terminating the off-time of transistor 32. Thus, the value of the off-time reference signal functions as a reference signal or reference value that is used by circuit 48 to control the off-time of transistor 32. This operation continues for each cycle of regulator 25 as the Q output of latch 29 goes high to begin enabling transistor 32 and begin another cycle of regulator 25. As will be seen from the previous description, if the valley value of current 19 is below the desired value, as represented by the value of the CS signal and the value of Vref2, circuit 41 adjusts the value of the off-time reference signal. The lower the value of the off-time reference signal the faster capacitor 50 charges to the off-time reference signal, thus, the shorter the off-time of transistor 32. Shortening the off-time enables transistor 32 in less time thereby increasing the valley value of current 19. Thus, the valley value of current 19 assists in forming the off-time reference value and the off-time reference value assists in setting the off-time of transistor 32. It should be noted that the value of Vref1 should be chosen to be larger than Vref2 in order to ensure that the peak value is greater than the valley value. The value of resistor 24 generally is chosen to set the valley value and the peak value to achieve a desired average value for current 19.

In the preferred embodiment, the value of Vref1 is selected to be about one hundred mill-volts and the value of Vref2 is selected to be approximately fifty milli-volts. Thus, the valley value is approximately fifty percent of the peak value. In other embodiments, other values may be used for Vref1 and Vref2 to change the percentage relationship between the peak and valley values.

In order to facilitate this operation of regulator 25, a first input of gate 30 this connected to input 34. A second input of gate 30 is commonly connected to the Q output of latch 29, a first input of gate 42, and a gate of transistor 49. An output of gate 30 is connected to an input of driver 31 which has an output connected to a gate of transistor 32. The drain of transistor 32 is connected to output 33. Source 40 of transistor 32 is connected to return 27 and sense terminal 39 is commonly connected to an inverting input of comparator 38, a non-inverting input of comparator 37, and input 36. An inverting input of comparator 37 is connected to the Vref1 output of reference 60, and the output of comparator 37 is connected to the reset input of latch 29. A non-inverting input of comparator 38 is connected to the Vref2 output of reference 60, and the output of comparator 38 is connected to a second input of gate 42. The output of gate 42 is connected to a gate of transistor 44 which has a source connected to return 27. A drain of transistor 44 is connected to a first terminal of resistor 45. A second terminal of resistor 45 is commonly connected to a first terminal of capacitor 46, an inverting input of comparator 52, and a first terminal of resistor 55. A second terminal of capacitor 46 is connected to return 27. A second terminal of resistor 55 is commonly connected to the output of regulator 58 and a first terminal of resistor 54. A second terminal of resistor 54 is commonly connected to a non-inverting input of comparator 52, a first terminal of capacitor 50, and a drain of transistor 49. The output of comparator 52 is connected to the set input of latch 29. A second terminal of capacitor 50 is connected to return 27 and to a source of transistor 49.

Figure 3:
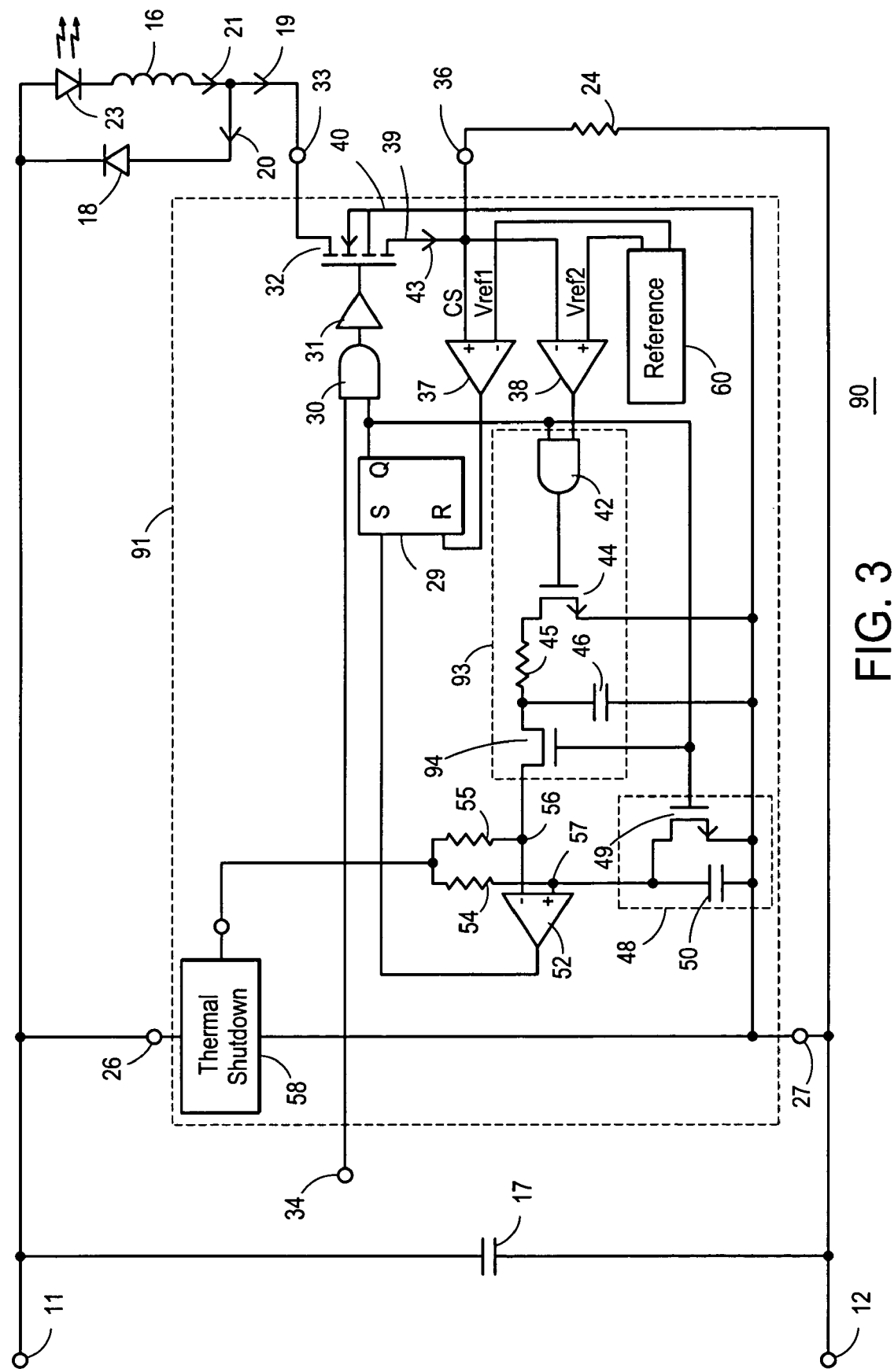
FIG. 3 schematically illustrates an embodiment of another current regulator that is an alternate embodiment of the current regulator of FIG. 1 in accordance with the present invention.

FIG. 3 schematically illustrates an exemplary embodiment of a portion of a power supply system 90 that is an alternate embodiment of system 10. System 90 includes an exemplary form of a switching current regulator 91 that is an alternate embodiment of regulator 25 explained in the description of FIG. 1. Regulator 91 includes an off-time reference circuit 93 that is an alternate embodiment of circuit 41 explained in the description of FIG. 1.

Circuit 93 includes a blocking transistor 94. Transistor 94 is enabled responsively to the Q output of latch 29 going high to begin enabling transistor 32. Enabling transistor 94 allows capacitor 46 to be charged responsively to enabling transistor 32. Transistor 94 is disabled responsively to the Q output of latch 29 going low to begin disabling transistor 32. Disabling transistor 94 ensures that the off-time reference signal does not substantially change value while transistor 32 is disabled. Configuring circuit 93 to charge the off-time reference signal only responsively to beginning to enable transistor 32 minimizes the amount that circuit 93 has to discharge from capacitor 46 in order to adjust the off-time reference signal and results in regulator 91 more accurately regulating the value of current 19. It is believed that circuit 91 maintains the value of the off-time reference signal within about three to five percent of the value required to keep the valley current value of current 19 to the desired valley current value.

Figure 4:
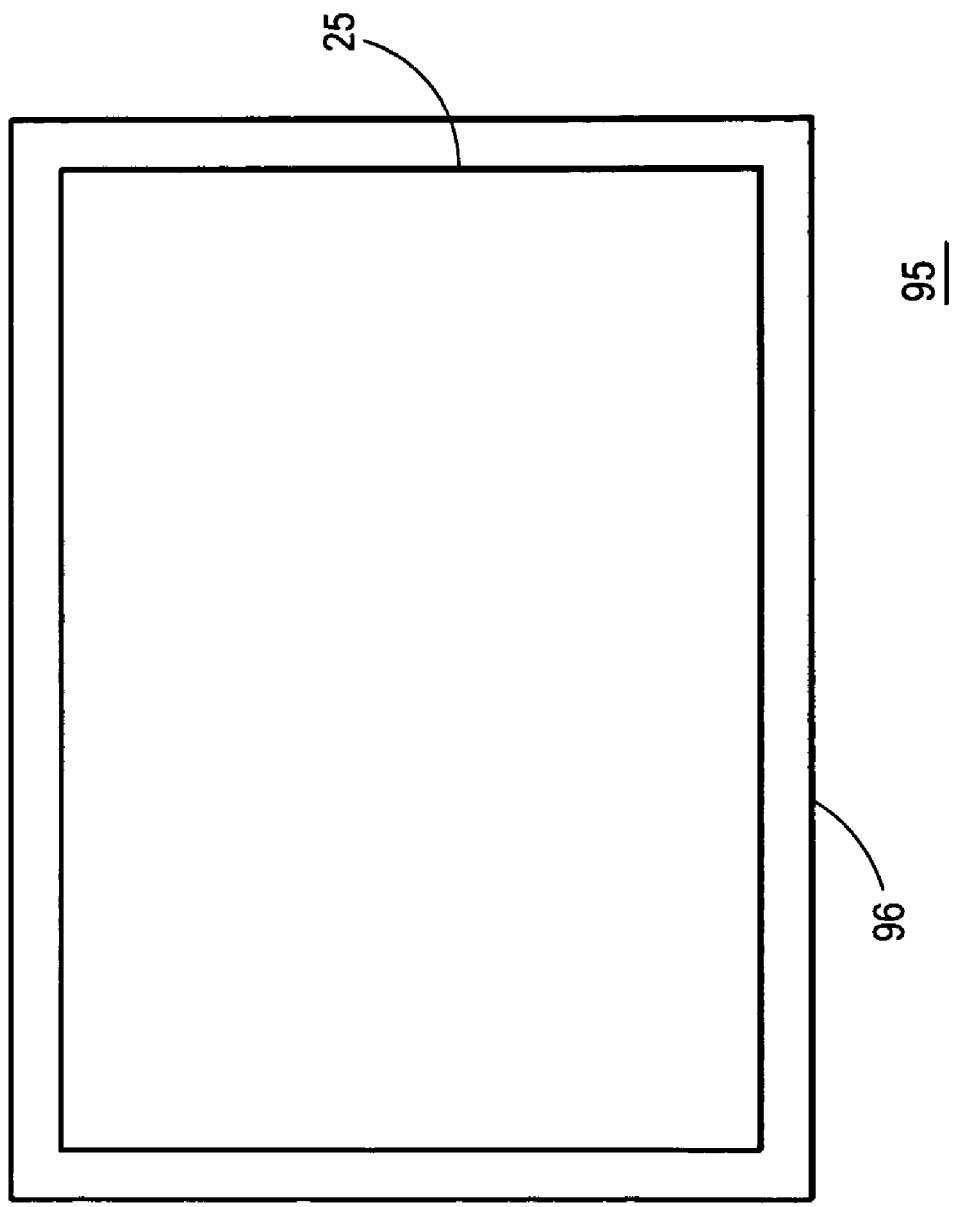
FIG. 4 schematically illustrates an enlarged plan view of a semiconductor device that includes the current regulator of FIG. 1 in accordance with the present invention.

FIG. 4 schematically illustrates an enlarged plan view of a portion of an embodiment of a semiconductor device 95 that is formed on a semiconductor die 96. Regulator 25 is formed on die 96. Die 96 may also include other circuits that are not shown in FIG. 4 for simplicity of the drawing. Regulator 25 and device 95 are formed on die 96 by semiconductor manufacturing techniques that are well known to those skilled in the art.

In view of all of the above, it is evident that a novel device and method is disclosed. Included, among other features, is using the value of current 19 to assist in forms the off-time of transistor 32. Using the value of current 19 to determine the off-time facilitates using a SenseFET type of power transistor thereby improving the efficiency of regulator 25. Using the value of current 19 to determine the off-time eliminates the need for external current sensing elements thereby reducing system costs and reducing power dissipation.

While the subject matter of the invention is described with specific preferred embodiments, it is evident that many alternatives and variations will be apparent to those skilled in the semiconductor arts. Although systems 10 and 90 are illustrated as inverted buck power supply systems, circuits 41, 48, and 93 are applicable to other types of power supply systems including boost configured systems, non-inverted buck systems, systems without a PWM latch, leading edge PWM systems, and trailing edge PWM systems. Those skilled in the art will appreciate that circuit 41 may have other embodiments as long as it forms the off-time reference signal responsively to the valley value of current 19, and that circuit 48 may have other embodiments as long as it forms the off-time control signal that represents the off-time of the power switch. More specifically the subject matter of the invention has been described for particular N-channel transistors, although the method is directly applicable to transistors including P-channel transistor, BiCMOS, metal semiconductor FETs (MESFETs), HFETs, and other transistor structures. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A current regulator comprising:
   a PWM section configured to enable a SenseFET type of power transistor to form a current through the power transistor;
   a storage element;

a first circuit configured to form on the storage element a first signal representative of the current through the power transistor; and a second circuit configured to use, after the power transistor is disabled, the first signal to establish a duration of an off-time of the power transistor, and to enable the power transistor responsively to the off-time expiring wherein the second circuit is configured to compare the first signal to a second signal formed by the second circuit to control the off-time of the power transistor.

2. The current regulator of claim 1 further including the second circuit configured to reset a value of the second signal responsively to enabling the power transistor, to change the value of the second signal responsively to disabling the power transistor, and the second circuit further including a comparator coupled to compare the second signal to the first signal and form a third signal to cause the current regulator to begin enabling the power transistor responsively to the second signal equaling the first signal.

3. The current regulator of claim 1 wherein the second circuit is configured to charge a capacitor to form the second signal responsively to beginning to disable the power transistor.

4. The current regulator of claim 1 wherein the second circuit is configured to use the first signal as a reference signal to control enabling the power transistor.

5. The current regulator of claim 1 wherein the first circuit is configured to store a voltage on a capacitor during the off-time of the power transistor and to use a value of a sense signal that is representative of the current through the power transistor during an on-time of the power transistor to adjust the voltage stored on the capacitor responsively to beginning to enable the power transistor and responsively to a value of the current through the power transistor.

6. A current regulator comprising:
a PWM section configured to enable a SenseFET type of power transistor to form a current through the power transistor;
a storage element;
a first circuit configured to form on the storage element a first signal representative of the current through the power transistor wherein the first circuit is configured to form a second value on the storage element during an off-time of the power transistor and to use a sense signal representative of the current through the power transistor during an on-time of the power transistor to adjust the second value to the first value responsively to the value of the current; and
a second circuit configured to use, after the power transistor is disabled, the first signal to establish a duration of an off-time of the power transistor, and to enable the power transistor responsively to the off-time expiring.

7. A method of forming a current regulator comprising:
configuring the current regulator to control an on-time of a power switch to form an output current having a first value that flows through the power switch; and
configuring the current regulator to form a first reference signal that is representative of a difference between the output current that flows through the power switch and a reference value of the output current, and after the power switch is disabled to use a value of the first reference signal to establish a duration of an off-time of the power switch; and configuring the current regulator to form a second signal that is representative of the off-time and to begin enabling the power switch responsively to the second signal being no less than the first reference signal.

8. The method of claim 7 wherein configuring the current regulator to control the on-time of the power switch includes configuring the current regulator to control the on-time of a SenseFET type of transistor.

9. The method of claim 7 wherein configuring the current regulator to form the second signal includes configuring a second circuit to form the second signal and configuring the current regulator to compare the second signal to the first reference signal to control the off-time.

10. The method of claim 9 further including configuring the current regulator to begin enabling the power switch responsively to the second signal that is representative of the off-time.

11. The method of claim 7 wherein configuring the current regulator to form the first reference signal includes configuring the current regulator to adjust a voltage stored on a capacitor responsively to a value of the output current.

12. The method of claim 11 further including configuring the current regulator to store the voltage on the capacitor responsively to beginning to enable the power switch and to the value of the output current.

13. The method of claim 11 including configuring the current regulator to couple a charging source to the capacitor during an on-time and an off-time of the power transistor.

14. The method of claim 11 further including configuring the current regulator to change a voltage on the capacitor responsively to beginning to enable a power transistor.

15. The method of claim 14 further including configuring the current regulator to couple a charging source and a discharging source to the capacitor only responsively to beginning to enable the power transistor.

16. A method of operating a current regulator comprising:
configuring the current regulator to use a sense output of a SenseFET transistor to form a first signal representative of a current through the SenseFET transistor during an on-time of the SenseFET transistor; and
configuring the current regulator to use the first signal to form a reference signal representative of a difference between a value of the current through the SenseFET and a desired value of the current and to use, after the SenseFET transistor is disabled, a value of the reference signal to determine an off-time of the SenseFET transistor.

17. The method of claim 16 wherein configuring the current regulator to use the sense output of the SenseFET transistor to form the first signal includes using the first signal to adjust a value of the reference signal used to control the off-time of the SenseFET transistor.

18. The method of claim 16 wherein configuring the current regulator to use, after the SenseFET transistor is disabled, the value of the reference signal to determine the off-time of the SenseFET transistor includes forming a second signal on a capacitor responsively to beginning to disable the SenseFET transistor and comparing the second signal to the reference signal.

* * * * *

UNITED STATES PATENT AND TRADEMARK OFFICE
CERTIFICATE OF CORRECTION

PATENT NO. : 7,579,818 B2 Page 1 of 1
APPLICATION NO. : 11/190226
DATED : August 25, 2009
INVENTOR(S) : Ball et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Fourteenth Day of September, 2010

David J. Kappos
*Director of the United States Patent and Trademark Office*